Aug. 1, 1961    T. HOFFACKER, JR., ET AL    2,994,497
STATIC LINE RETRIEVER
Filed Sept. 10, 1956                        6 Sheets-Sheet 1

INVENTORS
THEODORE HOFFACKER, JR. &
WILLIAM O. HAMMER
BY
Campbell, Brumbaugh, Free & Graves
their   ATTORNEYS

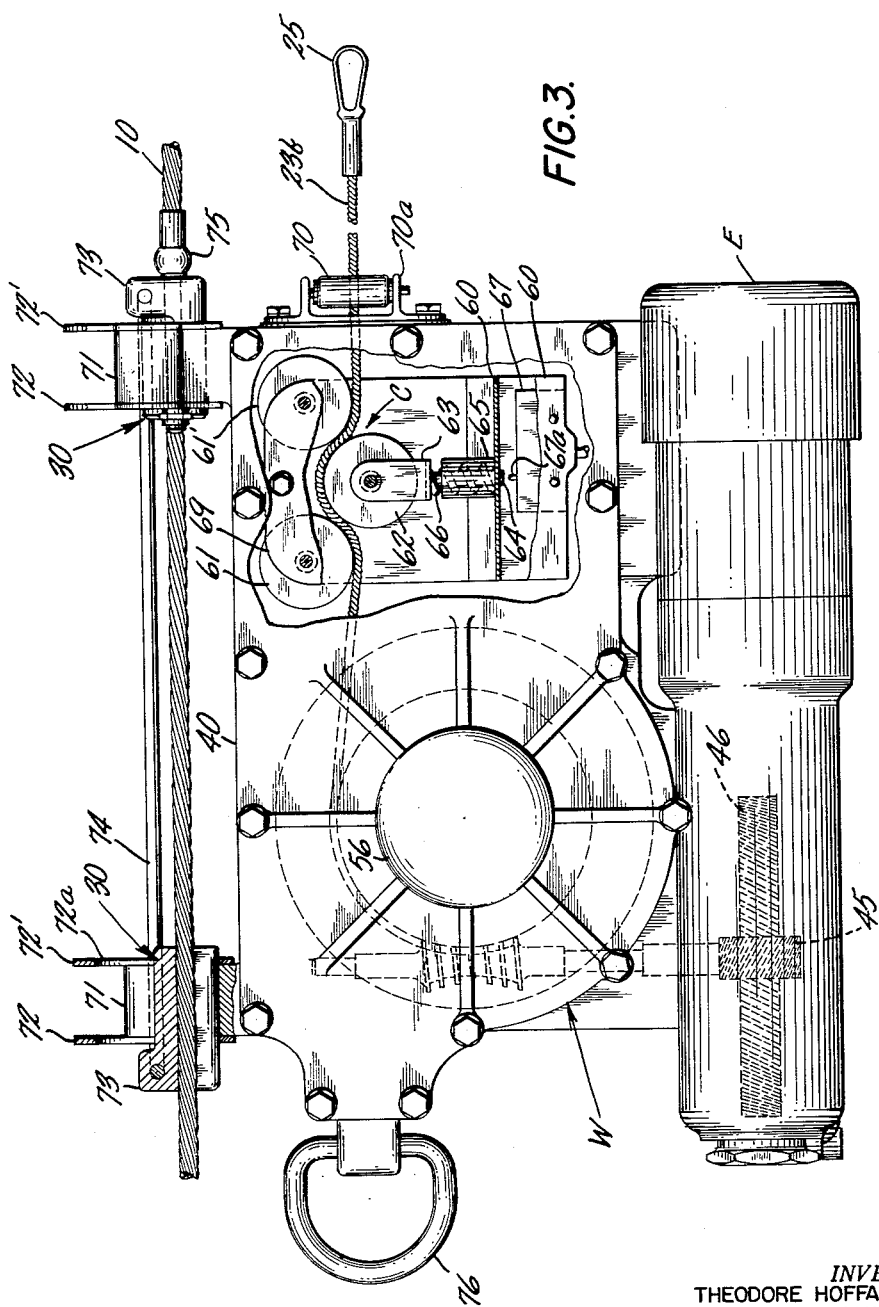

Aug. 1, 1961 T. HOFFACKER, JR., ET AL 2,994,497
STATIC LINE RETRIEVER
Filed Sept. 10, 1956 6 Sheets-Sheet 3
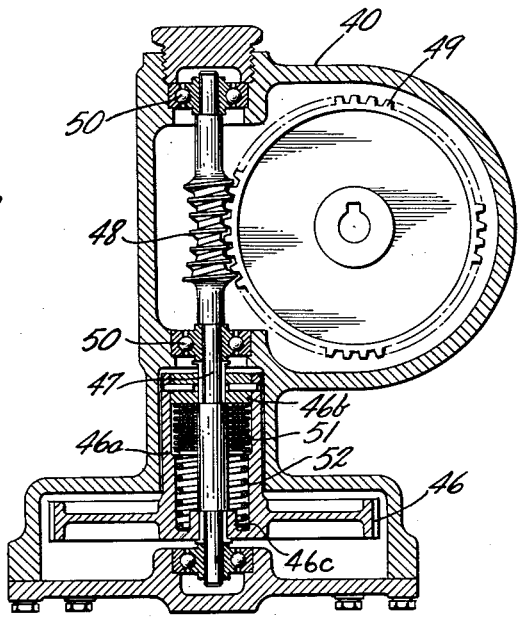
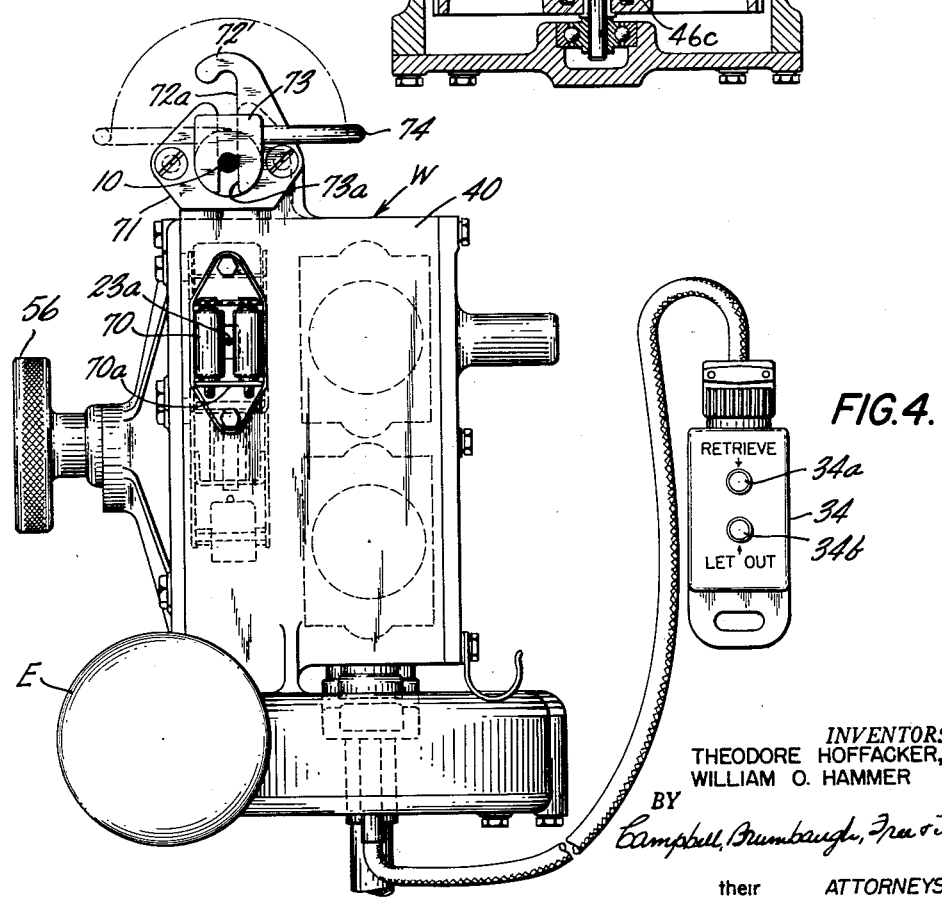
INVENTORS
THEODORE HOFFACKER, JR. &
WILLIAM O. HAMMER
BY
their ATTORNEYS

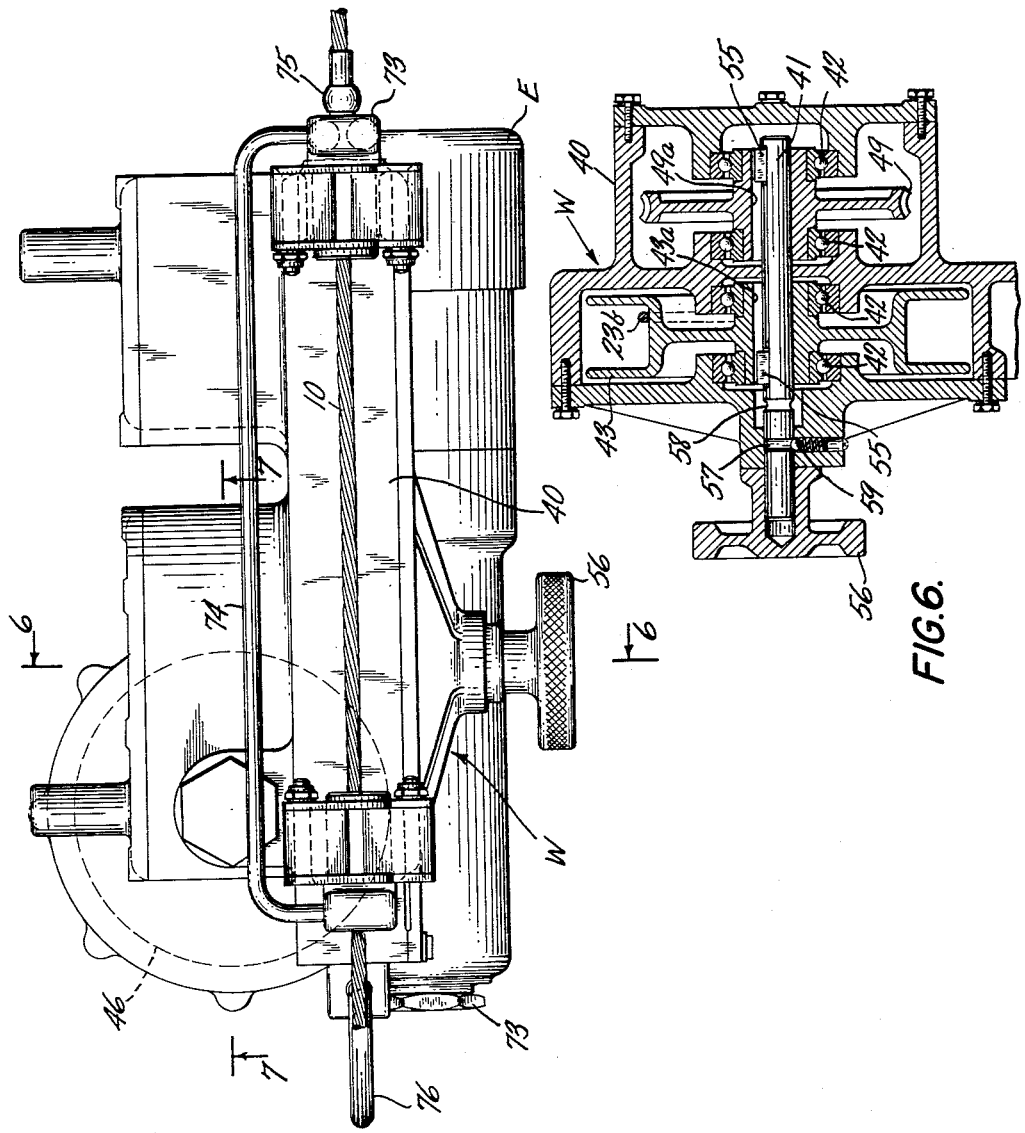

2,994,497
Patented Aug. 1, 1961

2,994,497
STATIC LINE RETRIEVER
Theodore Hoffacker, Jr., and William O. Hammer, Hagerstown, Md., assignors to Fairchild Engine and Airplane Corporation, Hagerstown, Md., a corporation of Maryland
Filed Sept. 10, 1956, Ser. No. 608,870
10 Claims. (Cl. 244—149)

This invention relates to apparatus for automatically retrieving parachute static lines by pulling them back into the fuselage of the airplane after the lines have opened the parachutes of the men or material dropped from the airplane.

When paratroopers are dropped from an airplane, the parachutes are opened individually and automatically by static lines, one line for each parachute. One end of the static line is attached to the "rip cord" which opens the parachute, and the other end is attached to a steel cable suspended the length of the airplane cabin. As the men proceed toward the doorway, they slide the static lines along the steel cable until they reach the doorway. As each man jumps free of the airplane, the static line is drawn taut, pulling the rip cord and opening the parachute. After all the men have jumped, the static lines must be pulled back into the airplane cabin in order to reduce drag on the airplane and to permit the door to be closed.

Retrieving the many static lines, however, is an extremely difficult and hazardous task. For example, the drag of thirty-two lines trailing from an airplane traveling at approximately 150 miles per hour amounts to approximately 190 pounds. At the present time, it is customary to retrieve the static lines by having two men pull them manually into the cabin. Considering the weight that must be pulled into the airplane cabin, it is obviously a dangerous assignment for the men performing the task.

The principal object of the present invention is to provide a power driven static line retriever, the operation of which is positive and quick-acting, wherein the apparatus is light in weight and occupies a minimum amount of space. In accordance with the present invention, a static line retriever is mounted for sliding movement along a track or cable to which the ends of the static lines are attached, and the retriever is connected by means of a flexible connection to a winch mechanism by means of which the retriever is adapted to be drawn along the track. In this way, the retriever collects the static lines and slides them along the track to bring them into the cabin of the airplane. The static line retriever of the present invention may also be employed to retract a man or a cargo bundle suspended on the static line due to malfunction of the equipment.

For a complete understanding of the present invention, reference may be made to the detailed description which follows and to the accompanying drawings in which:

FIGURE 3 is an enlarged elevation view of the winch mechanism;

FIGURES 4 and 5 are end and plan views, respectively, of the winch mechanism shown in FIGURE 3;

Figure 8:
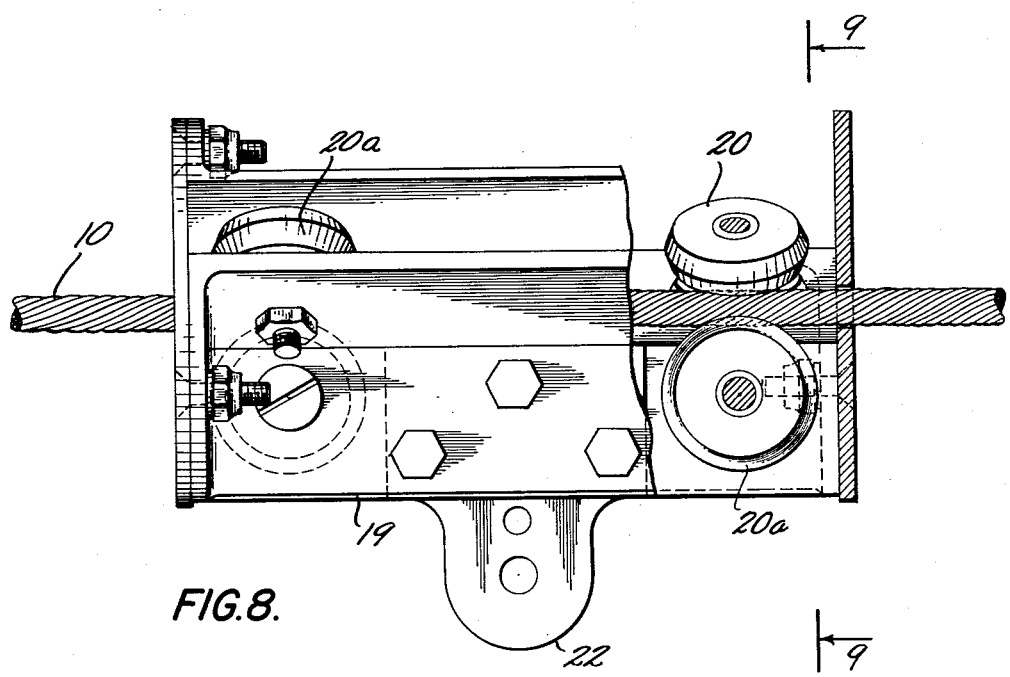
Figure 9:
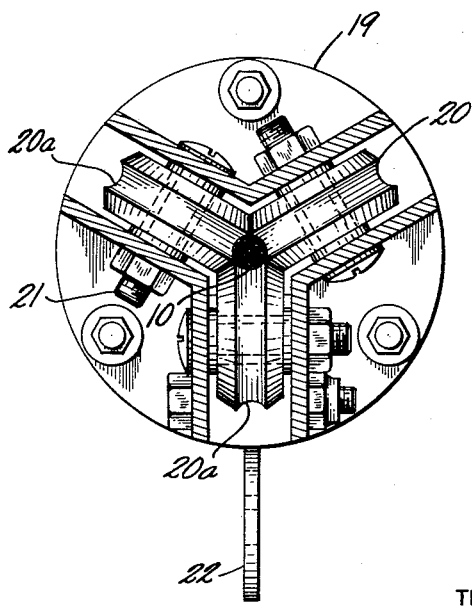
Figure 10:
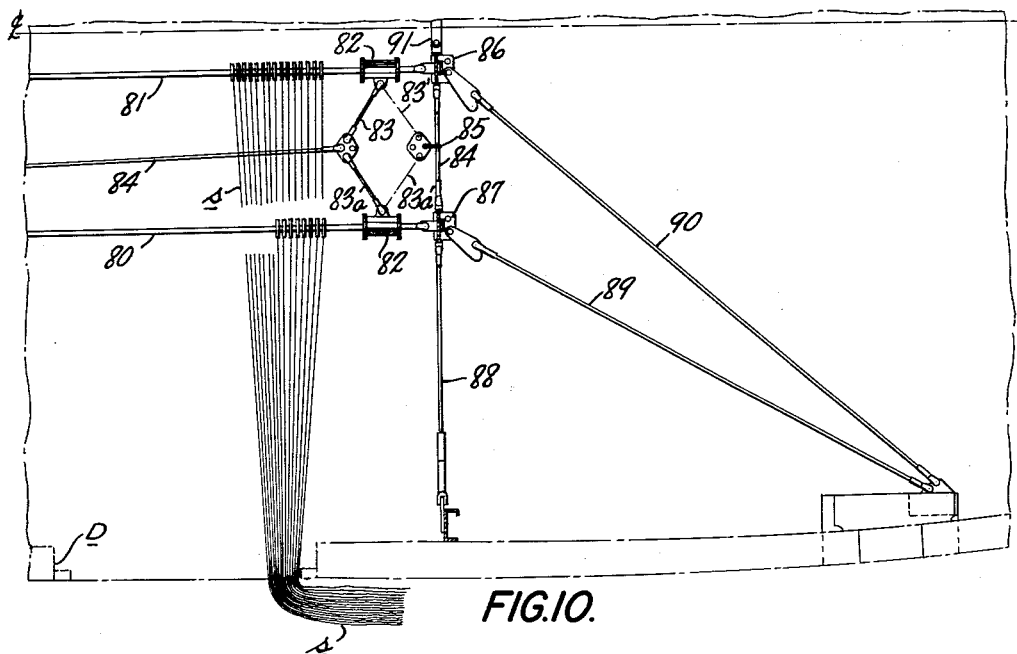
Figure 11:
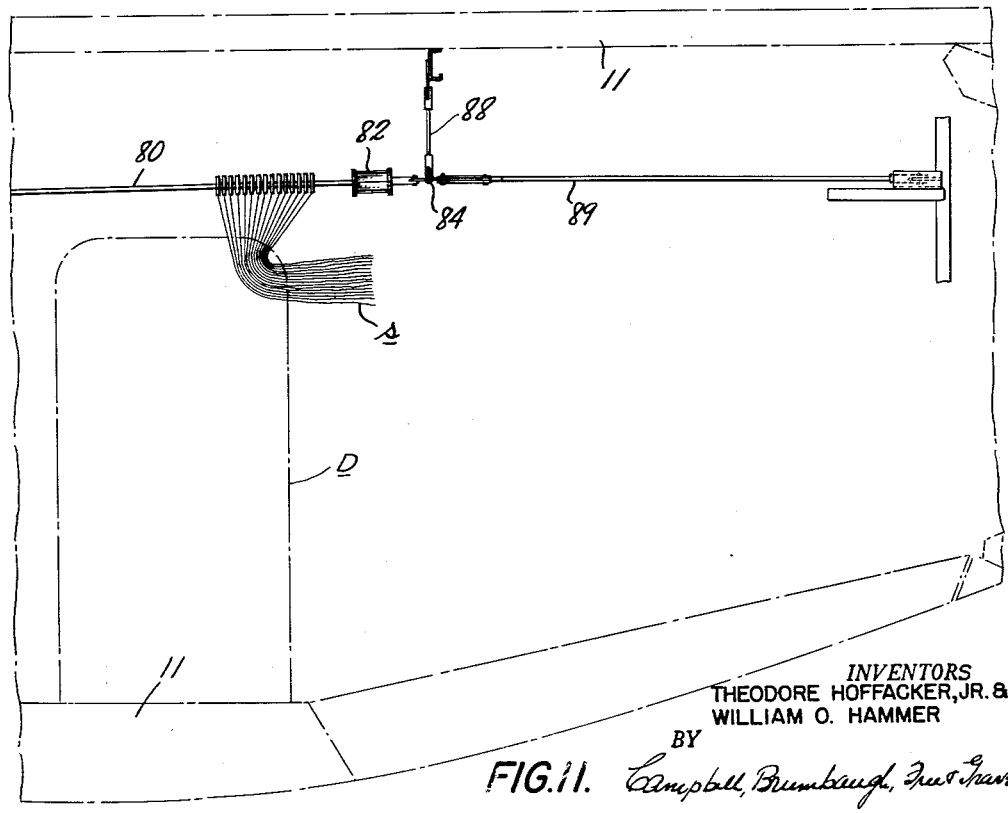

FIGURES 6 and 7 are cross-section views taken along the lines 6—6 and 7—7 of FIGURE 5 looking in the direction of the arrows;

FIGURE 8 is an enlarged view of the retriever;

FIGURE 9 is a cross-section view taken along the line 9—9 of FIGURE 8 looking in the direction of the arrows; and FIGURES 10 and 11 are plan and elevation views, respectively, of an alternative embodiment of the invention.

Figure 1:
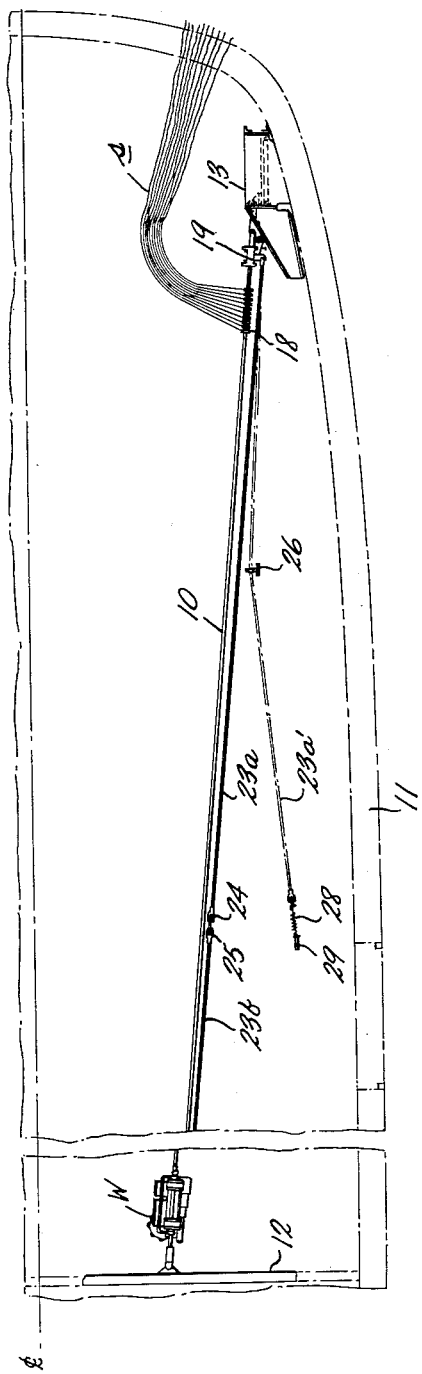
FIGURE 1 is a plan view of the apparatus installed within the fuselage of an airplane.
Figure 2:
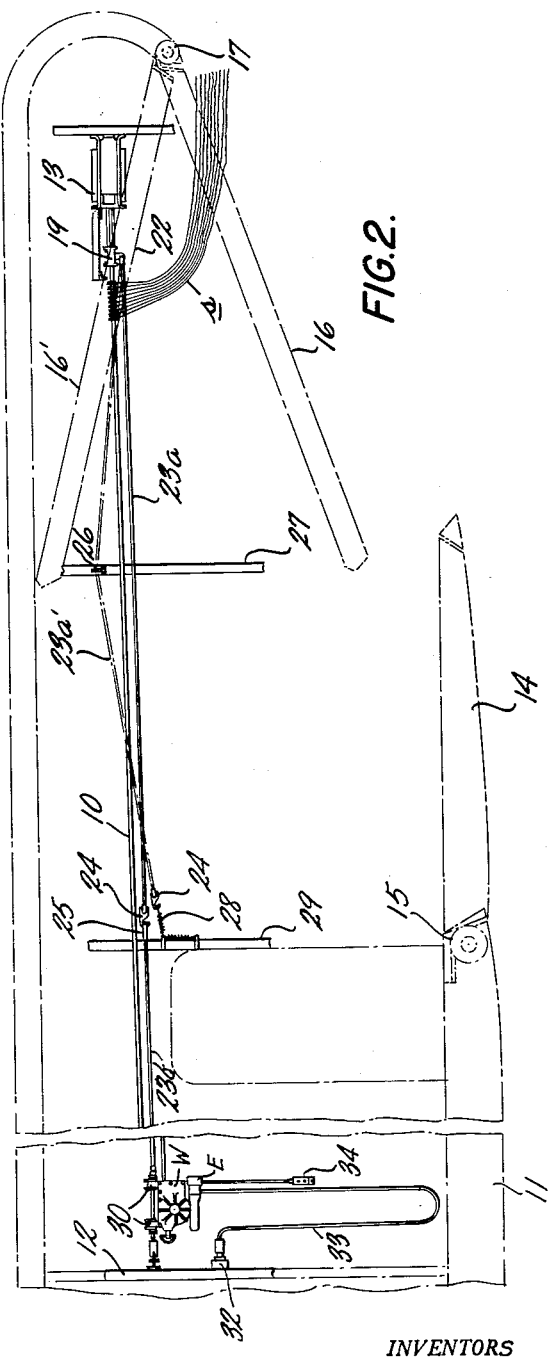
FIGURE 2 is an elevation view of the apparatus shown in FIGURE 1.

Referring to FIGURES 1 and 2 of the drawings, a steel cable 10 is mounted the length of an airplane cabin in the fuselage 11, the cable being mounted at one end to a forward bulkhead 12 of the cabin and at the other end to a fitting 13 attached to the tail end of the fuselage. If desired, there may be a plurality of such cables 10, for example, one on each side of the cabin, so that the static lines, generally designated s, may be attached to one or the other. The cable 10 leads toward a doorway in the fuselage. In the type of airplane illustrated in FIGURE 2 of the drawings, the fuselage is equipped with a two-part door in its tail end composed of a front portion 14 hinged at 15 and a rear portion 16 hinged at 17. In the door structure of the type shown in FIGURE 2, the front portion 14 is adapted to swing downwardly and the rear portion 16 upwardly (to the position indicated in phantom lines by the reference numeral 16'), thereby providing an opening in the tail of the fuselage through which men or materials can be dropped.

A plurality of static lines s are shown in FIGURES 1 and 2 in the positions which they would normally occupy after they have served their purpose in opening the parachutes and prior to being retrieved. Each of the static lines s is provided at one end with a ring fitting 18 which is capable of being coupled to the anchor cable 10 to slide thereon. The opposite end of the static line is attached to the rip cord of the parachute worn by the paratrooper or attached to the article being dropped.

The anchor cable 10 serves as a track or guide for a retriever trolley 19. The trolley 19 rides along the track or cable 10, sweeping all of the ring fittings 18 of the static lines s forwardly along the anchor cable to draw them through the door and into the cabin. The trolley, shown in detail in FIGURES 8 and 9, is provided with two clusters of three rollers 20, one cluster at each end of the trolley, which engage the cable 10. The rollers 20 of each cluster are rotatably mounted on studs 21 to the trolley and arranged at angles of 120° apart. Each of the rollers 20 is provided with a circumferential groove 20a (see FIGURE 9) which accommodates a portion of the cable 10 therein. To assure an easy travel of the trolley along the cable and to prevent any tendency to bind, the portions of the rollers on each side of the circumferential groove 20 are tapered and are virtually in rolling contact with each other.

The trolley is adapted to be pulled along the steel anchor cable 10 by means of a winch W and a two-piece retriever cable, the one end 23a being attached to the flange 22 of the trolley 19, and the other end 23b being connected to the winch W. The forward end of the aft cable 23a is provided with a hook 24 which can be connected to the forward cable 23b by the engagement thereof with a suitable eye-bolt type fitting 25 on the free end thereof. When the static line retriever is not in use, the aft cable 23a may be stowed in the position 23a' indicated by phantom lines in FIGURES 1 and 2. In this position, the cable is engaged with the hook 26 mounted to the vertical support member 27, and in order to maintain the cable taut in this position and prevent it from whipping about, the hook 24 at the free end of the cable is engaged with a coil spring 28 attached to the vertical support member 29.

The winch W is driven by a reversible electric motor E via a gear transmission, and the entire assembly is mounted within a common housing 40 which is hung from the steel anchor cable 10 by means of locking devices, generally designated 30. Power is supplied to the electric motor E from an outlet 32 via an electrical cable 33, and the direction of rotation of the motor may be controlled from a switch box 34 (see FIGURE 4) by switches 34a or 34b. The switch 34a completes an electrical circuit to the motor for operating the winch to wind in the cable 23b, 23a, and the control switch 34b completes an electrical circuit which rotates the electric motor E in a direction to pay out the cable 23b, 23a.

The winch assembly W comprises generally the housing 40, a rotatable transverse shaft 41 mounted within the housing, a cable spool or reel 43 mounted on the transverse shaft 41, and a drive transmission, to be described below, between the electric motor E and the reel 43. The rotation of the reel 43 in one direction will wind the cable 23b onto the circumference of the reel, and the rotation of the reel in the opposite direction will pay out the cable 23b.

The reel is adapted to be driven in one direction or the other from the electric motor through a speed reduction gear transmission which includes meshing spiral gears 45 and 46, the former being driven by the motor and the latter being loosely mounted to the lower end of a vertically disposed shaft 47, a multiple disk clutch 51 transmitting the drive from the gear 46 to the shaft 47, a worm gear 48 (see FIGURE 7) also mounted on the shaft 47, and a gear 49 mounted on the shaft 41 which supports the reel 43.

As shown in FIGURE 7, the vertically disposed shaft 47 is rotatably mounted within the housing 40 within bearings 50. The gear 46, which, as mentioned above, is loosely mounted on the shaft 47, is provided with a hollow hub portion 46a. An annular collar 46b is pinned to the upper end of the hollow bore of the hub 46a and an annular sleeve 46c is fitted into the lower end of the hollow bore of the hub, the collar 46b and the sleeve 46c being loose fitting on the shaft 47.

The multiple disk clutch 51, consisting of alternate friction disks splined at their inner peripheries to the shaft and alternate friction disks splined at their outer peripheries to the hub, is accommodated within the hollow bore of the gear hub 46. The disks are normally maintained in frictional engagement by a compression spring 52 accommodated within the hollow bore of the hub 46 beneath the friction disks. The spring permits the disks to slip, however, when the torque exceeds a predetermined value.

The reel 43 and the gear 49 are both provided with inner rims 43a and 49a, respectively, and the rims are rotatably mounted within the housing 40 by bearings 42. Normally, both the reel 43 and the gear 49 are connected to the shaft 41 by a key and keyway arrangement 55. The reel 43, however, may be disengaged from the shaft 41 when the shaft is moved axially to the left, as viewed in FIGURE 6. The longitudinal movement of the shaft 41 to couple it to and uncouple it from the reel 43 is facilitated by a knob 56 attached to the end of the shaft 41. The gear 49, however, remains at all times in engagement with the shaft 41. To facilitate the positioning of the shaft in either the engaged or disengaged position, the shaft is provided with a pair of circumferential grooves 57, 58 which are adapted to be engaged by the spring pressed ball detent 59.

In order to prevent the cable 23b from becoming slack and improperly wound onto the reel 43, a cable tensioning mechanism, generally designated C, is provided. The cable tensioning mechanism C is best described with reference to FIGURE 3 of the drawings, and it comprises a mounting frame 60, a pair of upper guide rollers 61 and 61' mounted between a pair of centrally pivoted arms 69 and 69' and a lower roller 62 intermediate the upper rollers 61, 61', the lower roller being mounted in an inverted U-shaped bracket 63 which is spring urged upwardly by a compression spring 66. A plunger 64 depends downwardly from the bracket 63, and the plunger is received within the hollow bore of a cylindrical mounting 65.

A micro-switch 67 is mounted beneath the plunger 64, and the switch is adapted to be actuated by the engagement of the plunger with the button 67a. The micro-switch 67 is in series with the switch controlled by the button 34b, that is to say, the switch which completes the circuit which drives the reel 43 in the direction to pay out the cable. The switch is held closed by the engagement of the plunger 64 therewith, so that the circuit controlled by the control button 34b is rendered operative. When, however, the plunger is raised out of contact with the button 67a, the switch is opened, and the circuit which controls the operation of the motor to pay out the cable is rendered inoperative.

When the reel 43 is winding in or paying out the cable 23b and the cable is sufficiently taut, the lower roller 62 is urged downwardly against the action of the spring 66 so that the lower end of the plunger 64 engages the button 67a of the micro-switch. The spring 66 is so selected as to maintain the plunger 64 in engagement with the button 67a of the micro-switch when the cable is under at least ten pounds of tension. When the cable develops slack, the compression spring will urge the roller 67 upwardly, thereby taking up the slack. This limited movement of the roller 62 will not necessarily actuate the switch 67, unless the tension drops below ten pounds. When, however, the cable is under less than ten pounds of tension, the switch 67 is actuated to render the circuit controlled by the switch button 34b inoperative.

As a further guide to the winding in or paying out of the cable 23b, the cable is adapted to pass between horizontally disposed brackets 70a mounted to the end of the housing 40 and between vertically disposed rollers 70 rotatably supported between the upper and lower brackets 70a.

As mentioned above, the housing 40 for the entire winch assembly W is suspended from the overhead anchor cable 10 by the anchoring devices 30 on the housing 40. The anchoring devices 30 each comprise a guide member 71 integrally formed at the top of the housing 40 and a lock member 73 rotatably mounted therein. The guide member 71 is provided with a vertical slot 72a open at the upper end. Hook members 72 and 72' are bolted to each end of the guide member 71, and they, too, are provided with vertically disposed slots (also designated 72a) which are in alignment with the slots of the guide member 71. The rotatable lock member 73 is provided with a slot 73a, and in the upright position of the lock member 73 the slot 73a is vertically disposed in alignment with the slot 72a, with the open end of the slot 73a at the top. The lock member 73 is adapted to be rotated 180° to an inverted or locked position. In this position the slot 73a is disposed downwardly. The base of the slot 73a, however, is slightly above the base of the slot 72a to accommodate the cable 10 therebetween. To facilitate the locking operation, the rotatable lock members 73 of both anchoring devices 30 are connected by a handle member 74. When, as illustrated in FIGURE 4, the handle 74 is pivoted through an arc of 180° from the position indicated in phantom lines to the position indicated in solid lines, the lock members 73 are rotated from the upright or unlocked to the inverted or locked position.

Thus, the housing may be readily anchored to the cable 10 by first adjusting the handle 74 to the position indicated in phantom lines in FIGURE 4 so that the slots 72a, 73a will be aligned with the open ends thereof at the top. The hook members 72, 72' afford a convenient means for mounting the housing 40 onto the cable 10 before locking it thereto. By rotating the handle 74 through an arc of 180°, the slot 73a will be rotated relative to the slots 72a, locking the anchor cable 10 therebetween.

The winch W is prevented from sliding on the anchor cable 10 by the abutment of the lock member 73 against a steel ball 75 on the cable. The steel ball may be replaced, of course, by any suitable clamping device; for example, the winch housing 40 may be anchored by passing a rope through the ring 76 and lashing it to some suitable part of the aircraft structure, such as the bulkhead 12, or if desired, the winch W may be affixed directly to the aircraft structure.

In operation, the cables 23a and 23b are connected. If the cable 23a is in the stowed position 23a' (indicated in phantom lines in FIGURES 1 and 2), the connection of the cables 23a and 23b may be facilitated by pulling the knob 56 outwardly, thereby disconnecting the reel 43 from the shaft 41 and permitting the reel to rotate freely as the end of the cable 23b is grasped by a crew member and unwound from the reel. The aft cable 23a is removed from its stowed position and joined to the end of the cable 23b connecting the hook 24 and the eyelet 25, and the knob 56 may be pushed inwardly to couple the reel 43 to the shaft 41. The crewmen then breaks a safety wire connecting the trolley 19 to the aft fitting 13, and the retriever is in readiness for operation. The drive transmission to the reel 43 is, of course, sufficiently powerful to break the safety wire which may hold the trolley 19 should the crew member forget to perform the operation.

After all of the paratroopers have jumped from the aircraft, the crew member may retrieve the static lines s by pressing the control button 34a. As the reel 43 winds the cable 23b, the trolley 19 will be drawn along the anchor cable 10, pulling the static lines through the door and into the cabin. In case a static line should become entangled in some fashion, the clutch 51 will slip, and the crewmen operating the winch can reverse the direction of the reel 43 to pay out the cable 23b by pressing the control button 34b, provided, of course, the load on the cable exceeds approximately ten pounds. As explained above, if the load on the cable is less than ten pounds, the micro-switch 67 will be opened and render the control button 34b inoperative.

An alternative embodiment of the invention is shown in FIGURES 10 and 11 of the drawings. In this embodiment, a pair of anchor cables 80, 81 are spaced side by side so that a single winch assembly can be used to retrieve the two groups of static lines s simultaneously. A trolley 82 is mounted on each of the cables 80 and 81, and the trolleys are connected by a pair of cables 83 to a common cable 84 which is connected to the winch assembly.

In this embodiment, the cables 83 may be stowed, when not in use, by tying them by a string or wire 85 to cable 84 which connects brackets 86 and 87 at the extreme rearward ends of the cables 80, 81. The cables 88, 89, 90 and 91 serve to anchor the ends of the cables 80 and 81 to the walls of the fuselage. During the retrieving operation, the winch will have sufficient power to break the string or wire 85, and the flexibility of the cables 80 and 81 will permit the rods to be pivoted over center to the position indicated in the solid lines in FIGURE 10.

The invention has been shown by way of example only, and obviously many modifications and variations may be made therein without departing from the spirit of the invention. For example, although the preferred embodiment of this invention uses electrical power to drive the winch, other power means, such as hydraulic or pneumatic means, may be employed. The invention, therefore, is not to be limited to any specified form or embodiment, except as set forth in the appended claims.

We claim:

1. An airplane including a fuselage, a door in the fuselage and an apparatus for retrieving static lines through said door after they have served to open parachutes, said apparatus comprising a cable mounted in a fore and aft direction within the fuselage of the airplane, at least a portion of the cable being in proximity to the door, a trolley movably mounted on said cable, a winch mechanism, drive means therefor, a common housing for said winch mechanism and said drive means, means for suspending said common housing from the cable, said suspending means including a pair of members having open ended slots formed therein, at least one of said members being rotatable relative to the other from a position at which the slots are aligned to a locked position in which the slots are out of alignment, and a flexible connection between the winch mechanism and the trolley, the winch mechanism being operative to draw the trolley along the cable to collect and slide the static lines along said cable, thereby pulling them through the door.

2. Apparatus for retrieving static lines as set forth in claim 1 including a plurality of said rotatable members and means connecting all of said rotatable members for simultaneous rotation.

3. Apparatus for retrieving static lines after they have served to open parachutes comprising a track to which the static lines are slidably affixed, a static line retriever movably mounted on the track, a driven rotatable reel, a flexible connection between said rotatable reel and the static line retriever, said flexible connection being adapted to be wound onto or unwound from the reel, drive means for the reel, control means for driving the reel in a winding direction, control means for driving the reel in an unwinding direction, and a drive transmission from the drive means to the driven wheel which includes a driven gear mounted coaxially with said rotatable reel, a longitudinally adjustable shaft therebetween, a splined connection between the driven gear and the adjustable shaft, and a splined connection which in one position of adjustment of the shaft couples the reel and the shaft, and in the other position of adjustment of the shaft uncouples the reel and the shaft.

4. An airplane including a fuselage, an external door in the fuselage and an apparatus for retrieving a group of static lines through said external door of the airplane after they have served to open parachutes, said apparatus comprising an elongated support suspended within the airplane, one portion of the support being more proximate to the external door than another portion thereof, a static line being attachable at one end to the support for sliding movement along said support, the free ends of the static lines passing through the external door dangling in the slip stream of the airplane after they have served their function of opening parachutes, a power driven winch, means for detachably suspending said power driven winch from the support at a position thereon remote from the external door, a flexible line wound at one end on said winch and capable of being wound onto or let out from said winch, and static line retriever means at the opposite end of the flexible line engageable with the static line most remote from the winch so that when the flexible line is wound onto the winch the dangling ends of all of the static lines will be pulled through the external door from the slip stream.

5. Apparatus for retrieving static lines as set forth in claim 4 wherein the means for detachably suspending the winch from the elongated support includes a pair of members having open ended slots formed therein, at least one of said members being rotatable relative to the other from a position at which said slots are aligned to a locked position at which said slots are out of alignment.

6. Apparatus for retrieving static lines as set forth in claim 5 in which there are a plurality of suspending means and including means connecting all of the rotatable members for simultaneous rotation.

7. Apparatus for retrieving static lines as set forth in claim 4 including a motor for driving the winch and a drive transmission from the motor to the winch, said drive transmission including a driven gear and a longitudinally adjustable shaft which in one position couples the driven gear and the winch and in another position uncouples the driven gear and the winch.

8. Apparatus for retrieving static lines as set forth in claim 4 including drive means for the winch and a drive transmission from the drive means to the winch, said drive transmission including a driven gear, a rotatable worm gear in engagement with said driven gear, a worm gear shaft, a driven gear loosely mounted on the worm gear shaft, said loosely mounted gear having a hollow hub, a plurality of friction discs within the hollow hub, alternate of said friction discs being splined to the hub and different alternate of said friction discs being splined to the worm gear shaft, and a compression spring accommodated within said hollow hub urging the friction discs into frictional engagement.

9. In an airplane having a fuselage and an external door in the fuselage, the combination of an elongated support within the fuselage, said elongated support receiving thereon the ends of static lines for sliding movement along said elongated support and affording an anchorage for the static lines attached thereto to permit them to open parachutes, the free ends of the static lines attached to the elongated support passing through the external door and dangling in the slip stream of the airplane after they have served to open parachutes, a power driven winch, means for mounting said power driven winch within the fuselage of the airplane at a location remote from the external door, but in proximity to the end of the elongated support remote from the external door, a flexible line wound at one end on said winch and capable of being wound onto or let out from said winch, static line retriever means at the opposite end of the flexible line and engageable with the static line most remote from the winch so that when the flexible line is wound onto the winch the dangling ends of all of the static lines will be pulled through the external door from the slip stream, a motor for driving the winch, and a drive transmission from the motor to the winch, said drive transmission including a driven gear and a longitudinally adjustable coupling which in one position couples the driven gear and the winch and in another position uncouples the driven gear and the winch.

10. In an airplane having a fuselage and an external door in the fuselage, the combination of an elongated support within the fuselage, said elongated support receiving thereon the ends of static lines for sliding movement along said elongated support and affording an anchorage for the static lines attached thereto to permit them to open parachutes, the free ends of the static lines attached to the elongated support passing through the external door and dangling in the slip stream of the airplane after they have served to open parachutes, a power driven winch, means for mounting said power driven winch within the fuselage of the airplane at a location remote from the external door, but in proximity to the end of the elongated support remote from the external door, a flexible line wound at one end on said winch and capable of being wound onto or let out from said winch, static line retriever means at the opposite end of the flexible line and engageable with the static line most remote from the winch so that when the flexible line is wound onto the winch the dangling ends of all of the static lines will be pulled through the external door from the slip stream, drive means for the winch and a drive transmission from the drive means to the winch, said drive transmission including driving and driven elements in telescoping relationship, a plurality of friction discs within the hollow hub, alternate of said friction discs being splined to the one element and different alternate of said friction discs being aplined to the other element, and a compression spring urging the friction discs into frictional engagement providing a slip drive for the winch.

References Cited in the file of this patent

UNITED STATES PATENTS

| | | |
|---|---|---|
| 623,328 | Miller | Apr. 18, 1899 |
| 886,287 | Davis | Apr. 28, 1908 |
| 1,529,796 | Kalbach | Mar. 17, 1925 |
| 1,716,025 | Bledsoe | June 4, 1929 |
| 1,771,006 | Watson | July 22, 1930 |
| 1,848,972 | Peebles | Mar. 8, 1932 |
| 2,114,897 | Bird et al. | Apr. 19, 1938 |
| 2,292,738 | Bonney | Aug. 11, 1942 |
| 2,326,813 | Wilson | Aug. 17, 1943 |
| 2,332,112 | Pritchard | Oct. 19, 1943 |
| 2,786,092 | Gage | Mar. 19, 1957 |

FOREIGN PATENTS

| | | |
|---|---|---|
| 686,173 | Great Britain | Jan. 21, 1953 |